United States Patent [19]

Cooper et al.

[11] Patent Number: 4,783,256

[45] Date of Patent: Nov. 8, 1988

[54] ADAPTER ASSEMBLY FOR FILTER ARRANGEMENT

[75] Inventors: Roydon B. Cooper, Newport Richey, Fla.; Walter A. Mordes, Jr., East Northport, N.Y.

[73] Assignee: Pall Corporation, Glen Cove, N.Y.

[21] Appl. No.: 891,323

[22] Filed: Jul. 31, 1986

[51] Int. Cl.[4] .................. B01D 35/14; G01L 13/00
[52] U.S. Cl. .................. 210/90; 210/DIG. 17; 116/268; 116/DIG. 12
[58] Field of Search .................. 210/90, 130, 133, 168, 210/416.5, 741, DIG. 17; 116/268, DIG. 42; 73/119 R, 756

[56] References Cited

U.S. PATENT DOCUMENTS

| | | | |
|---|---|---|---|
| 2,729,339 | 1/1956 | McCoy | 210/183 |
| 3,250,242 | 5/1966 | Pekarek | 210/DIG. 17 |
| 3,869,905 | 3/1975 | Allen | 73/119 |
| 3,929,643 | 12/1975 | Donaldson et al. | 210/DIG. 17 |
| 3,943,760 | 3/1976 | Allen | 73/119 |
| 4,372,848 | 2/1983 | Manders | 210/90 |
| 4,452,695 | 6/1984 | Schmidt | 210/DIG. 17 |
| 4,626,344 | 12/1986 | Fick et al. | 210/90 |

*Primary Examiner*—Benoit Castel
*Assistant Examiner*—Richard D. Jordan
*Attorney, Agent, or Firm*—Leydig, Voit & Mayer

[57] ABSTRACT

The disclosure describes an adapter assembly for a conventional fluid system having a filter unit mounted to a filter pad. The adapter assembly allows the pressure differential across the filter element to be conveniently measured by a differential pressure detector. The adapter assembly, which is mounted between the filter pad and the filter unit, generally comprises an adapter plate, a mechanism for attaching and sealing the adapter plate to the filter pad, a mechanism for attaching and sealing the filter unit to the adapter plate, and a fitting for connecting the differential pressure detector to the adapter plate. The adapter plate includes at least one aperture which allows fluid to flow between the inlet chamber of the filter pad and the inlet of the filter unit and another aperture which allows fluid to flow between the outlet of the filter unit and the outlet chamber of the filter pad. The adapter assembly further comprises structure defining a fluid channel to the detector fitting from the fluid flowing between the inlet chamber of the filter pad and the inlet of the filter unit and structure defining another fluid channel to the detector fitting from the fluid flowing between the outlet of the filter unit and the outlet chamber of the filter pad.

4 Claims, 4 Drawing Sheets

ADAPTER ASSEMBLY FOR FILTER ARRANGEMENT

TECHNICAL FIELD

The present invention relates to the measurement of pressure differential across filters in fluid systems and, in particular, to the measurement of the pressure differential across the filter element of a spin-on type filter mounted on a filter pad, such as frequently utilized in fuel supply, hydraulic, and lubrication systems.

BACKGROUND ART

Engine oil lubrication systems, which are typical of many fluid systems, frequently utilize a spin-on on type filter unit which is mounted on a filter pad and which includes a filter element to remove potentially damaging particles from the oil. Mechanical wear within the engine, the outside environment, and contaminants introduced accidentally during normal servicing are sources of particles which may plug lubricating nozzles, severely damage parts, and create excessive wear on any surfaces relying on a thin film of lubricating oil for protection.

These systems typically utilize a pump to force oil to circulate through the filter pad and spin-on filter unit assembly and then to the moving parts of the engine for lubrication. Oil is forced through the filter element due to a difference in oil pressure, i.e., a pressure differential, between the upstream and downstream sides of the filter element, the pressure on the upstream side being greater than the pressure on the downstream side.

Over time, as the spin-on filter unit performs its filtering function, the filter element of the spin-on filter unit becomes plugged by particles removed from the lubricating oil. As the amount of material filtered from the lubricating oil and retained by the filter element increases, a greater pressure differential across the filter element is required to pump sufficient fluid through the filter element. The amount of lubricating oil which will pass through the filter element at the maximum pumping pressure will decrease until flow is insufficient to maintain proper lubrication of the engine. To prevent that occurrence, many lubrication systems include a pressure-sensitive bypass valve which will open when the pressure differential across the filter element approaches that corresponding to the maximum pumping pressure, allowing oil to bypass the filter element. This assures that lubricating oil will continue to reach the moving parts of the engine but eliminates, at least in part, the filtering function.

Thus, to assure that sufficient filtered oil continues to reach the moving parts of the engine, filter units must be replaced before they become so clogged as to cause the bypass valve to open. As few lubrication systems are equipped to monitor the pressure differential across the filter element to determine when the filter unit should be replaced, the spin-on filter units are replaced at regular intervals of operation. Although the rates at which a filter element becomes blocked will vary greatly depending upon operating conditions for the engine, the filter unit replacement interval must be selected to be the shortest probable time in which excessive blockage may occur to assure continuous proper lubrication system function. This results in the frequent disposal of filter units before their filtering capacity has been fully utilized, resulting in higher operational costs.

Some lubrication systems utilizing spin-on filter units include a pressure detector which senses the pressure only on the high pressure side, i.e., the upstream side, of the filter. The detector may be used to operate a filter blockage warning light when the upstream pressure becomes greater than a predetermined amount, e.g., approaches maximum pumping pressure. However, the pressure on the upstream side of the filter element is dependent on the overall lubrication system pressure and cumulative pressure drop through the system and is not necessarily indicative of the filter condition. Thus, such a detector may result in a false indication of the need to replace a filter element if the system becomes blocked downstream of the filter unit.

Few new engines have lubrication systems equipped with a pressure differential monitor because of the expense of providing instrumentation to measure pressure on both the upstream and downstream sides of the filter element and determine the difference between the two. The difficulty of accommodating such a monitoring system within the confines of the lubrication systems is also an important factor. Retrofit of existing engines to provide for monitoring of the differential pressure across the filter element of the lubrication system is particularly difficult if pressure-sensing devices must be installed within the crankcase together with leads for appropriate instrumentation.

DISCLOSURE OF THE INVENTION

It is an object of the invention to provide for monitoring of the pressure differential across the filter element of a spin-on filter unit. Further, it is an object of the invention to provide for monitoring of the differential pressure across the filter element of existing systems, such as internal combustion engines, utilizing spin-on filter units mounted on filter pads which have been fabricated with no contemplation of providing for such monitoring capability.

Accordingly, the invention provides an adapter assembly for a conventional fluid system having a filter unit mounted to a filter pad. The filter unit typically includes a fluid inlet, a fluid outlet, and a filter element positioned in the fluid flow path between the inlet and the outlet. The filter pad typically includes an inlet fluid chamber which communicates with the inlet of the filter unit and an outlet fluid chamber which communicates with the outlet of the filter unit.

In accordance with the invention, the adapter assembly allows the pressure differential across the filter element to be conveniently measured by a differential pressure detector. The adapter assembly, which is mounted between the filter pad and the filter unit, generally comprises an adapter plate, a mechanism for attaching and sealing the adapter plate to the filter pad, a mechanism for attaching and sealing the filter unit to the adapter plate, and a fitting for connecting the differential pressure detector to the adapter plate. The adapter plate includes at least one aperture which allows fluid to flow between the nnlet chamber of the filter pad and the inlet of the filter unit and another aperture which allows fluid to flow between the outlet of the filter unit and the outlet chamber of the filter pad. Thus, the adapter assembly does not interfere with the flow of fluid between the filter pad and the filter unit. In addition, the adapter assembly comprises structure defining a fluid channel to the detector fitting from the fluid flowing between the inlet chamber of the filter pad and the inlet of the filter unit and structure defining another fluid channel to the detector fitting from the fluid flowing between the outlet of the filter unit and the outlet chamber of the filter pad. By providing these channels, the differential pressure detector may effectively sense the pressure differential across the filter element.

The invention thus provides a convenient, effective and economical way to allow monitoring of the pressure differential across the filter element of either a new or existing system utilizing a spin-on filter mounted on a filter pad. For example, the invention may provide input for an indicator to be used to warn of clogged filter elements so operation of an engine with the bypass valve open may be avoided yet filters may be used to their full capacity for greatest economy.

Other objects, advantages, and aspects of the invention will become apparent upon reading the following detailed description and appended claims and upon reference to the accompanying drawings.

BEST MODE FOR CARRYING OUT THE INVENTION

Figure 1:
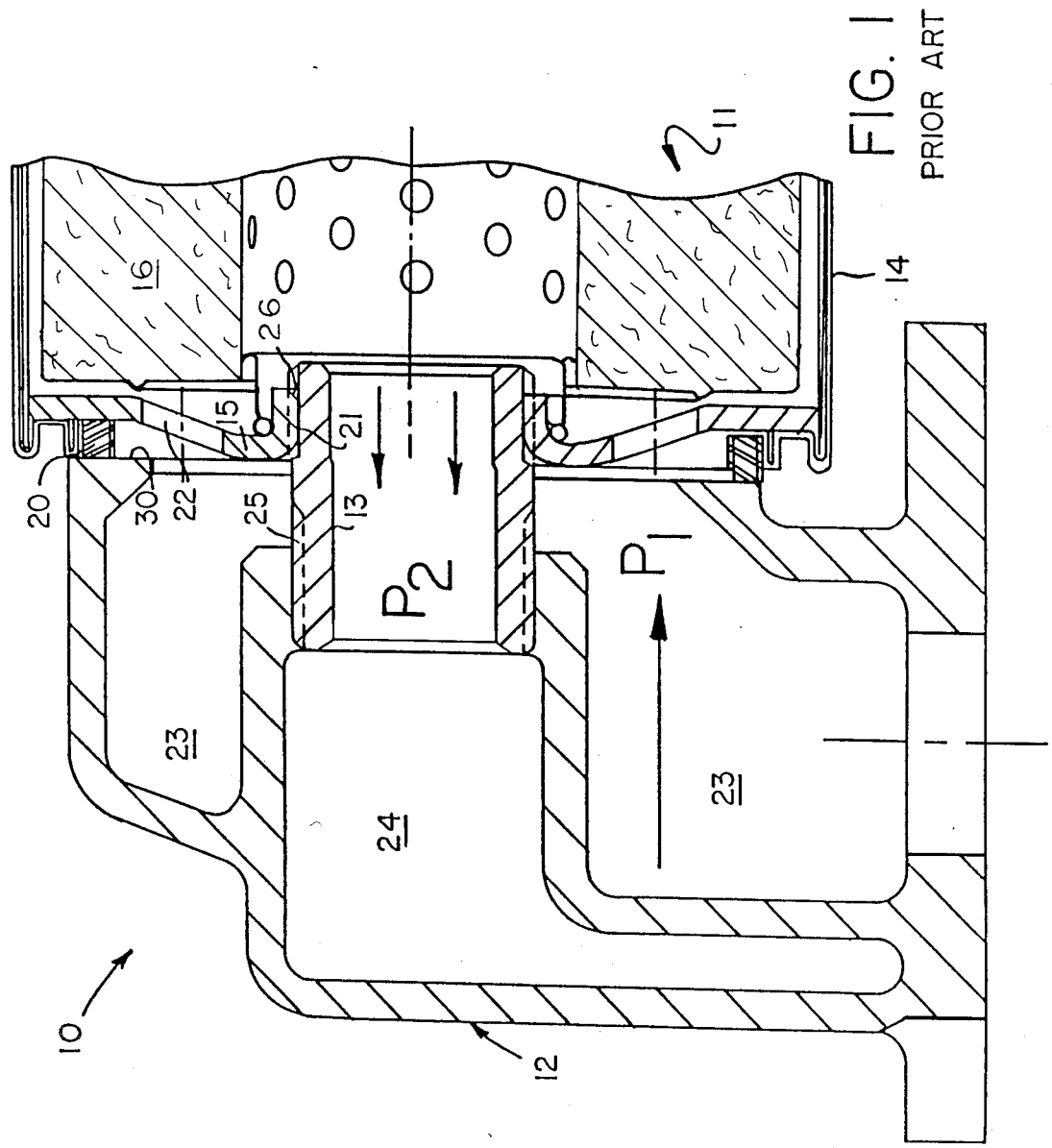
FIG. 1 is a sectional view of a conventional filter arrangement including a spin-on filter unit mounted on a filter pad.

As shown in FIG. 1, a conventional filter arrangement 10 may comprise a spin-on filter unit 11 mounted to a filter pad 12 by means of a hollow, threaded stud 13. The filter unit 11 typically includes a housing 14 which is sealed to the periphery of an attachment plate or base 15 and which contains a hollow, cylindrical filter element 16. The filter element 16 is mounted concentrically to one side of the base 15 while a seal 20 is mounted concentrically to the opposite side of the base 15. The base 15 includes a central outlet hole 21 and several inlet holes 22 positioned between the outlet hole 21 and the seal 20.

The filter pad 12 defines separate inlet and outlet chambers 23, 24 which are respectively coupled to inlet and outlet lines or ports (not shown) of a fluid system such as a hydraulic or lubrication oil system. The filter pad 12 includes threads 25 to receive one end of the hollow stud 13, while the base 15 includes threads 26 at the outlet hole 21 to receive the opposite end of stud 13. With the stud 13 tightened to the filter pad 12, the base 15 of the filter unit 11 may be threaded onto the stud 13 until the seal 20 seats tightly against a seating surface 30 of the filter pad 12.

Fluid at a pressure $P_1$ may then be forced into the inlet chamber 23 of the filter pad 12. From the inlet chamber 23, the fluid flows through the inlet holes 22 in the base 15, into a space between the housing 14 and the filter element 16, and radially·inwardly through the filter element 16. As the fluid flows through the filter element 16, particles are filtered from the fluid and the pressure of the fluid drops from $P_1$ to $P_2$. Filtrate at pressure $P_2$ then flows from the interior of the filter element 16 through the hollow stud 13 into the outlet chamber 24 of the filter pad 12.

In accordance with the invention, an adapter assembly may be disposed between the spin-on filter unit 11 and the filter pad 12. Without interfering with the flow of fluid through the filter unit 11 and filter pad 12, the adapter assembly allows the pressure differential across the filter element 16 to be detected.

Figure 2:
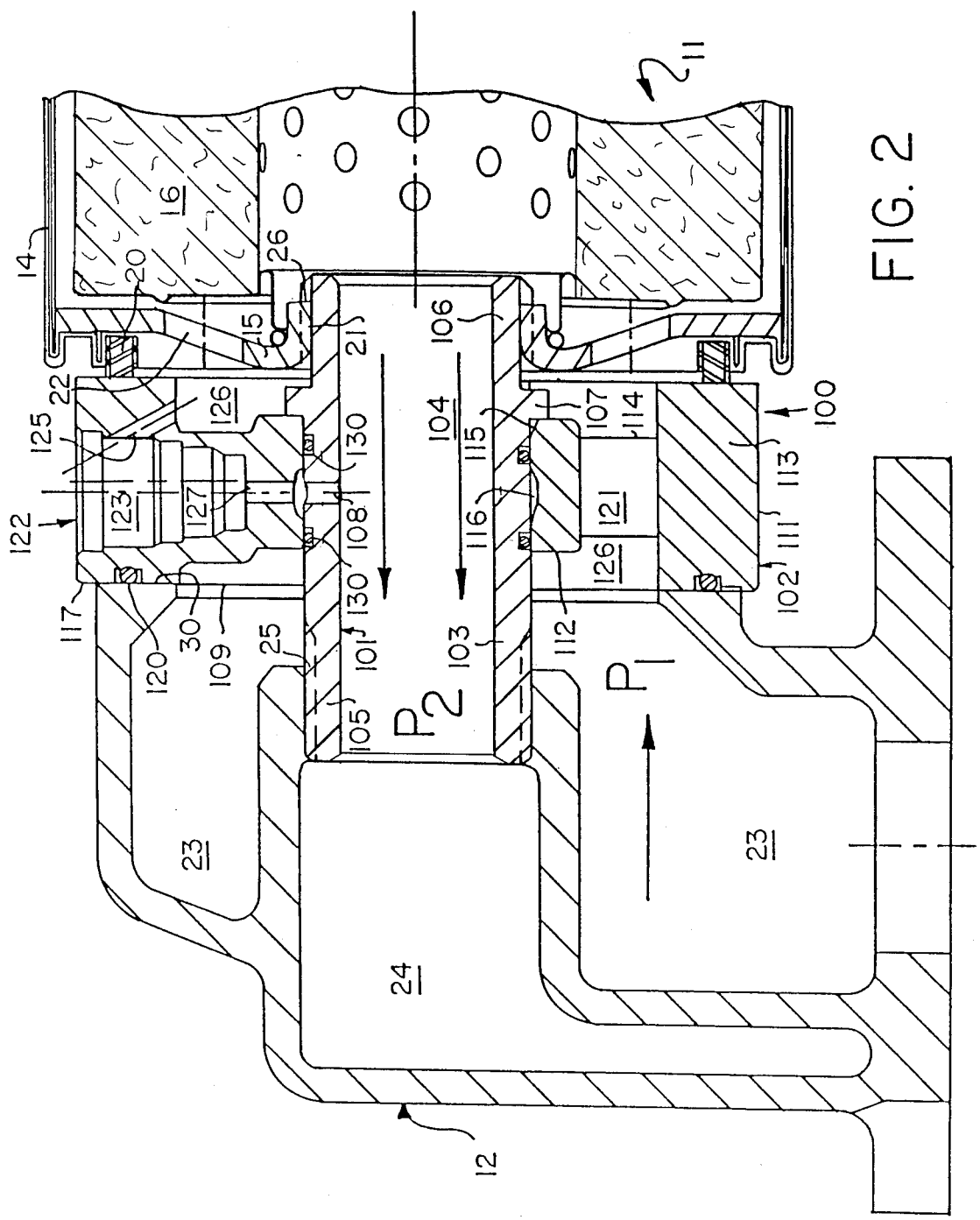
FIG. 2 is a sectional view of a first exemplary adapter assembly embodying the invention as shown mounted between a spin-on filter unit and a filter pad and is taken along line II—II of FIG. 3.
Figure 3:
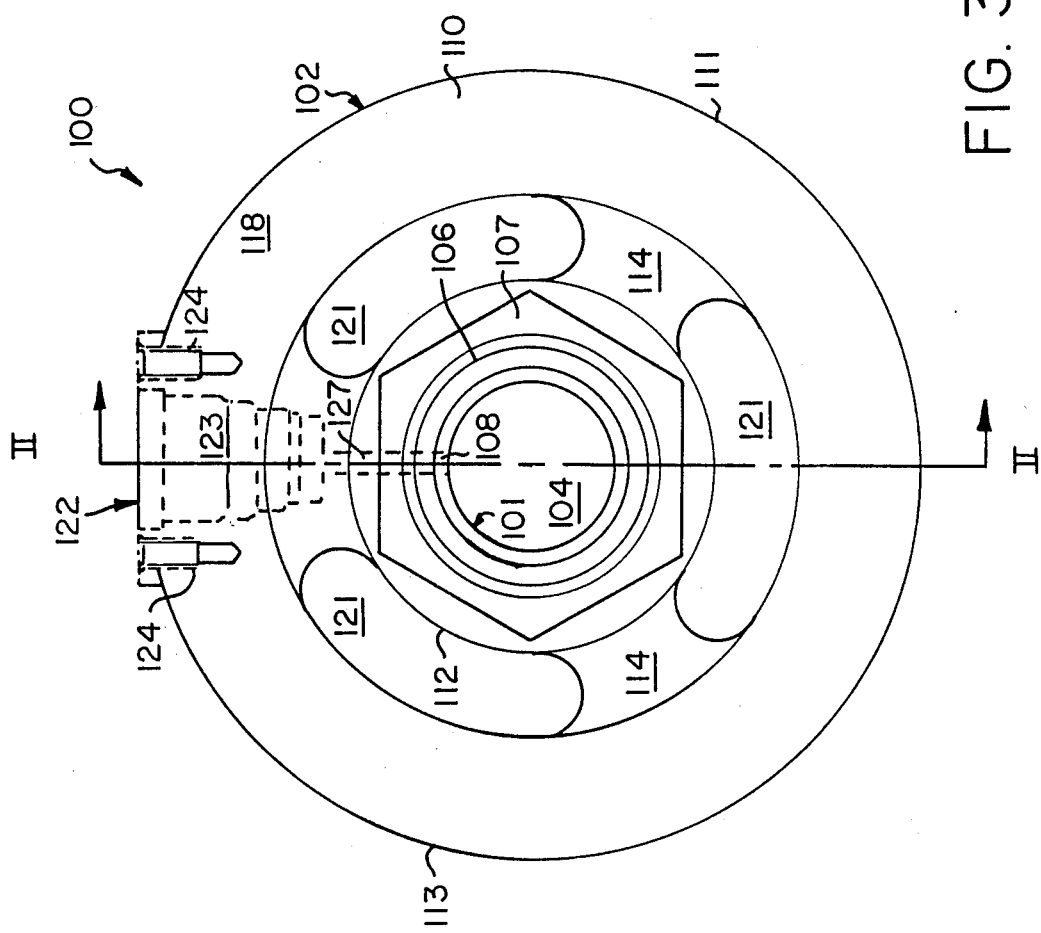
FIG. 3 is a plan view of the first exemplary adapter assembly of FIG. 2.

As shown in FIGS. 2 and 3, a first exemplary adapter assembly 100 embodying the invention generally comprises a hollow, threaded hub 101 and an adapter plate 102. The hub 101, which may be fashioned from any suitable rigid impervious material compatible with the fluid being filtered, has a generally tubular body 103 defining a central channel 104. A first end 105 of the hub 101 is threaded to engage the threads 25 of the filter pad 12, while a second end 106 of the hub 101 is threaded to engage the threads 26 of the base 15 of the spin-on filter unit 11. A flange 107 extends radially outwardly from the tubular body 103 at a position near the second end 106 of the hub 101. Flats are preferably formed along the periphery of the flange 107, allowing engagement by a wrench to tighten the hub 101 onto the filter pad 12 to an appropriate degree of torque. A fluid passage 108 extends through the tubular body 103 at a position between the first end 105 of the hub 101 and the flange 107.

The adapter plate 102, which also may be fashioned from any suitable rigid impervious material compatible with the fluid being filtered, preferably has a circular form, as shown in FIG. 3, generally comprising first and second sides 109, 110 and a peripheral edge 111. The adapter plate 102 includes a ring-shaped inner portion 112 held in fixed coaxial relation to a ring-shaped outer portion 113 by several spokes 114. The inner portion 112 defines a central aperture 115 which has a diameter that is greater along an inner section of the axis of the inner portion 112, providing an expanded portion 116 of the central aperture 115. The outer portion 113 includes first and second end faces 117, 118. The first end face 117, which has mounted to it a circular seal 120, such as the groove and O-ring arrangement illustrated in FIG. 2, has a diameter similar to that of the seating surface 30 of the filter pad 12. The spokes 114 define several apertures 121 between the inner and outer portions 112, 113 of the adapter plate 102.

To allow detection of the differential pressure across the filter element 16 the adapter plate 102 further includes a fitting 122 to which a differential pressure detector (not shown) may be mounted. In the first exemplary adapter assembly 100, the fitting 122 generally comprises an orifice 123 which is disposed in the peripheral edge 111 of the adapter plate 102 and extends radially inward through the ring-shaped outer portion 113 into a spoke 114. The detector, which may comprise any suitable conventional device, such as those available from Pall Corporation under the trademarks DELTAMYND or DELTADYNE, may be mounted within the orifice 123, for example, by bolts (not shown) cooperating with tapped holes 124 in the outer portion 113. Alternatively, the detector may be mounted by means of a retaining ring or threaded fitting. A first fluid passage 125 communicates between outer section of the detector orifice 123 and a space 126 between the inner and outer portions 112, 113 of the adapter plate 102, which space 126 includes the apertures 121. A second fluid passage 127 communicates between the expanded portion 116 of the central aperture 115 and an inner section of the detector orifice 123. However, the locations at which the first and second passages 125, 127 intersect the detector orifice 123 as well as the shape of the detector orifice 123 may vary depending on the particular differential pressure detector being used.

The first exemplary adapter assembly 100 may be easily installed in the conventional filter arrangement 10 shown in FIG. 1. The spin-on filter unit 11 is first removed from the filter pad 12 by unscrewing it from the threaded stud 13. The threaded stud 13 is then removed by unscrewing it from the threads 25 of the filter pad 12.

Next, the adapter assembly 100 with the differential pressure detector installed in the fitting 122 is mounted to the filter pad 12. For example, the first end 105 of the hub 101 may be passed through the central aperture 115 of the adapter plate 102 until the flange 107 engages the ring-shaped inner 10 portion 112 of the adapter plate 102. In this position, the fluid passage 108 of the hub 101 communicates between the central channel 104 and the expanded portion 116 of the central aperture 115 of the adapter plate 102, the expanded portion 116 providing positive relief from the hub 101 along its axial span. The first end 105 of the hub 101 may then be loosely engaged in the threads 25 of the filter pad 12, and the adapter plate 102 may be rotated about the hub 101 to locate the fitting 122 in any desired position. With the adapter plate 102 held in position, the hub 101 may then be tightened to the filter pad 12 by means of the flats on the flange 107. By the action of the flange 107 against the inner ringshaped portion 112 of the adapter plate 102, the first side 109 of the adapter plate 102 may be drawn to and retained against the filter pad 12 with the seal 120 on the adapter plate 102 sufficiently sealed against the seating surface 30 of the filter pad 12.

Although an adapter assembly embodying the invention may be a one-piece construction, the two-piece construction comprising the hub 101 and adapter plate 102 of the first exemplary assembly 100 is particularly advantageous. Because the enlarged portion 116 of the central aperture 115 enables the fluid passage 108 in the hub 101 to communicate with the second fluid passage 127 in the adapter plate 102 regardless of their relative angular orientation, the adapter plate 102 may be positioned in any desired angular (i.e., universal) orientation about the hub 101 independent of the angular orientation of the hub 101 required to sufficiently tighten the hub 101 to the filter pad 12. This is important when the available space is limited or when the differential pressure detector is visible only at a particular orientation.

Once the first exemplary adapter assembly 100 is mounted to the filter pad 12, the spin-on filter unit 11 may be mounted to the second side 110 of the adapter plate 102 by engaging te threads 26 on the base 15 of the filter unit 11 with the threaded second end 106 of the hub 101. The filter unit 11 is then tightened onto the hub 101 until the seal 20 on the base 15 of the filter unit is sufficiently sealed against the second end face 118 of the ring-shaped outer portion 113 of the adapter plate 102. Replacement of the filter unit 11 simply requires unscrewing the old filter unit 11 from the hub 101 of the adapter assembly 100 and then screwing a new filter unit 11 onto the hub 101.

In the preferred mode of operation, fluid at a pressure $P_1$ may be forced into the inlet chamber 23 of the filter pad 12. From the inlet chamber 23, fluid flows through the space 126 between the inner and outer ring-shaped portions 112, 113. Seals 130, such as the groove and O-ring arrangements, between the hub 101 and the adapter plate 102 on both sides of the expanded portion 116 of the central aperture 115 prevent the fluid from flowing directly into the hub 101 and bypassing the filter element 16. From the space 126, the fluid flows through the inlet holes 22 in the base 15 of the filter unit 11, into the space between the housing 14 and the filter element 16, and radially inwardly through the filter element 16 where any harmful particles are filtered from the fluid and the pressure of the fluid drops from $P_1$ to $P_2$. Filtrate at pressure $P_2$ then flows from the interior of the filter element 11 through the central channel 104 of the hub 101 into the outlet chamber 24 of the filter pad 12.

In accordance with the invention, the differential pressure across the filter element 16 may be detected by the differential pressure detector (not shown) by means of the adapter assembly 100. The upstream high pressure fluid is channeled to the differential pressure detector via the first fluid passage 125, communicating the pressure $P_1$ to the differential pressure detector. The downstream low pressure fluid is channeled to the differential pressure detector via the fluid passage 108 in the hub 101, the expanded portion 116 of the central aperture 115, and the second fluid passage 127 in the adapter plate 102, communicating the pressure $P_2$ to the differential pressure detector. Thus, the seals 130 further isolate the fluid communication between the central channel 104 of the hub 101 and the detector orifice 123.

Figure 5:
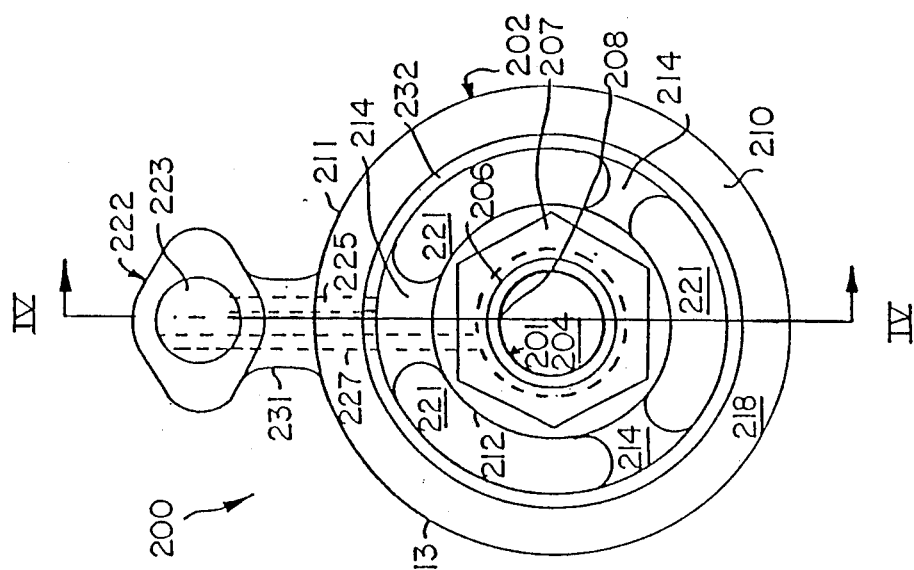
FIG. 5 is a plan view of the second exemplary adapter assembly of FIG. 4.
Figure 4:
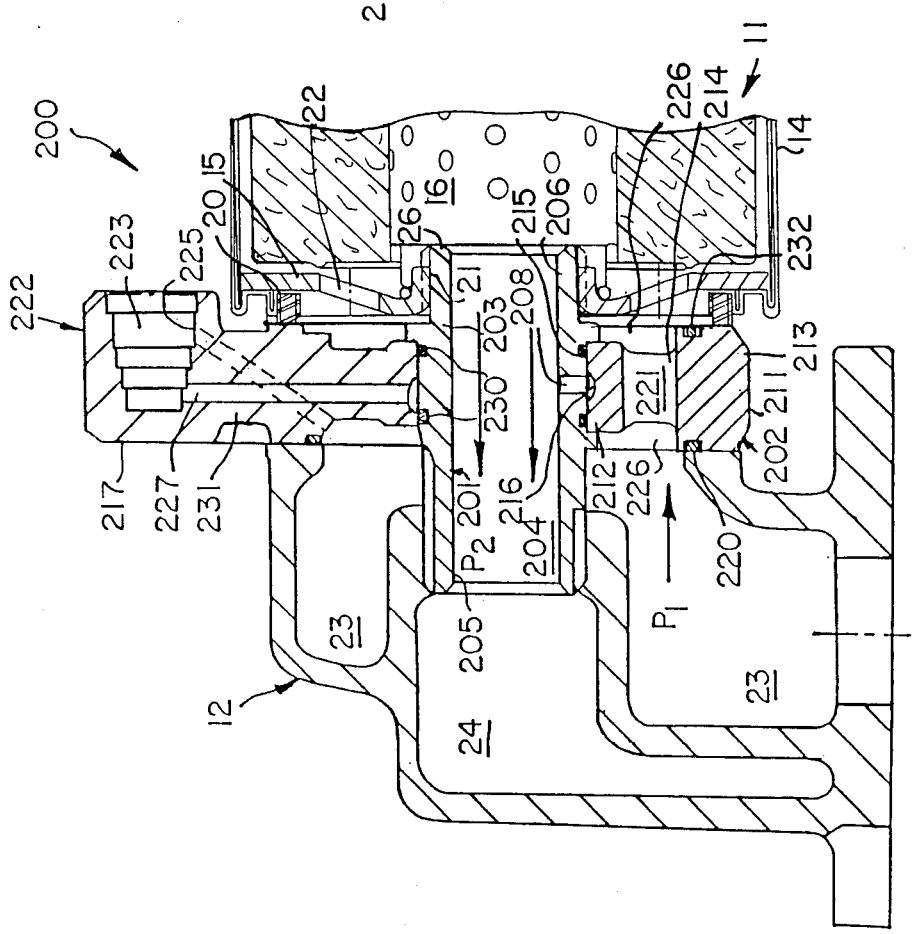
FIG. 4 is a sectional view of a second exemplary adapter assembly embodying the present invention as shown mounted between a spin-on filter unit and a filter pad and is taken along line IV—IV of FIG. 5.

As shown in FIGS. 4 and 5, a second exemplary adapter assembly 200, which may be installed in the conventional filter arrangement 10 and operated similarly to the first exemplary adapter assembly 100, generally comprises a hub 201 and an adapter plate 202 similar to those of the first exemplary adapter assembly 100. (Components of the second exemplary adapter assembly 200 analogous to those of the first exemplary adapter assembly 100 are identified by reference numerals having the same last two digits as those of the first exemplary adapter assembly 100.) However, the fitting 222 of the second exemplary adapter assembly 200 comprises a boss 231 formed on the perimeter 211 the adapter plate 202. The boss 231 includes a detector orifice 223 similar to that of the first exemplary adapter assembly 100. The first and second fluid passages 225, 227 of the adapter plate 202 again communicate, respectively, between an outer section of the detector orifice 223 and the space 226 between the inner and outer ring-shaped portions 212, 213 and between the expanded portion 216 of the central orifice 215 and an inner section of the detector orifice 223.

Although the axis of the detector orifice 223 may be oriented within the boss 231 in any direction relative to the axis of the adapter plate 202, the axis of the detector orifice 223 is shown parallel to that of the adapter plate 202 and hub 201. This allows the differential pressure detector (not shown) to be mounted to the adapter plate 202 at an angle perpendicular to the plane of the adapter plate 202. Thus, the differential pressure detector may extend closely along the side of the spin-on filter unit 11 to facilitate installation in a confined environment.

In the second exemplary adapter assembly 200, the circular seal 220 mounted to the first end face 217 of the ring-shaped outer portion 213 of the adapter plate 202 has a different diameter than the seal 20 on the base 15 of the spin-on filter unit 11. Further, the second end face 218 of the outer portion 213 also includes a groove 232 into which an O-ring may be installed. Since the first and second end faces 217, 218 are similarly shaped, the adapter plate 202 may be reversed so the first end face 217 contacts the seal 20 of the spin-on filter unit 11 while an O-ring seal in the second end face 218 contacts the seating surface 30 of the filter pad 12. This allows the differential pressure detector to be mounted to the adapter plate 202 so that it extends along the side of either the spin-on filter unit 11 or the filter pad 12.

While two exemplary adapter assemblies embodying the invention have been shown, it will be understood, of course, that the invention is not limited to those embodiments. Modification may be made by those skilled in the art, particularly in light of the foregoing teaching. For example, the adapter assembly may comprise an adapter plate that may be positioned between the filter pad and the spin-on filter unit of a conventional filter arrangement by simply threading it onto the stud. It is, therefore, contemplated by the appended claims to cover any such modification which incorporates the essential features of this invention or encompasses the true spirit and scope of the invention.

We claim:

1. In a fluid system including a spin-on filter unit which as a base with a fluid inlet and a fluid outlet and a filter element disposed in the fluid flow path between the inlet and the outlet and which is attachable to a filter pad having an inlet chamber and an outlet chamber, an adapter assembly to allow detection of differential pressure across the filter element by a differential pressure detector, the adapter assembly comprising:

an adapter plate having a first side and a second side, and an aperture to allow fluid to flow from the inlet chamber of the filter pad to the inlet of the filter unit;

a hub detachably mounted to the adapter plate and including means for attaching the hub to the filter pad, means for retaining the first side of the adapter plate in sealed engagement with the filter pad, means for retaining the base of the filter unit in sealed engagement with the second side of the adapter plate, and a fluid channel to allow fluid to flow from the outlet of the filter unit to the outlet chamber of the filter pad;

means for connecting a differential pressure detector to the adaptor plate;

a first passage means for communicating fluid flowing through the aperture in the adapter plate to the detector connecting means; and a second passage means for communicating fluid flowing through the channel in the hub to the detector connecting means, said detector connecting means having a detector orifice intercepting the first and second fluid passage means, said first and second sides similarly formed so that either may sealingly engage the filter pad, sealingly engage the base of the filter unit, and cooperate with said retaining means so that said adapter plate is reversible.

2. The adapter assembly of claim 1 wherein the adapter plate is generally circular and wherein an axis of the detector orifice is parallel to an axis of the adapter plate.

3. The adapter assembly of claim 1 wherein the adapter plate includes a ring-shaped outer portion, a ring-shaped inner portion, and at least one spoke fixing the inner and outer portions in coaxial relation, said aperture being disposed between the inner and outer portions.

4. In a fluid system including a spin-on filter unit which as a base with a fluid inlet and a fluid outlet and a filter element disposed in the fluid flow path between the inlet and the outlet and which is attachable to a filter pad having an inlet chamber and an outlet chamber, an adapter assembly to allow detection of differential pressure across the filter elmement by a differential pressure detector, the adapter assembly comprising:

an adapter plate comprising a ring-shaped outer portion, a ring-shaped inner portion, and at least one spoke fixing the inner and outer portions in coaxial relation, a first side and a second side, and an aperture disposed between the inner and outer portions to allow fluid to flow from the inlet chamber of the filter pad to the inlet of the filter unit;

a hub detachably mounted to the adapter plate and including means for attaching the hub to the filter pad, means for retaining the first side of the adapter plate in sealed engagment with the filter pad, means for retaining the base of the filter unit in sealed engagement with the second side of the adapter plate, and a fluid channel to allow fluid to flow from the outlet of the filter unit to the outlet chamber of the filter pad;

means for connecting a differential pressure detector to the adaptor plate;

a first passage means for communicating fluid flowing through the aperture in the adapter plate to the detector connecting means; and a second passage means for communicating fluid flowing through the channel in the hub to the detector connecting means;

wherein the detector connecting means includes a detector orifice extending into the adapter plate from a peripheral edge and having an axis extending radially inward toward the center of the adapter plate, the detector orifice intercepting the first and second fluid passage means, said second fluid passage means being coaxial with said orifice and extending radially through said spoke; and said first and second sides similarly formed so that either may sealingly engage the filter pad, sealingly engage the base of the filter unit, and cooperate with said retaining means so that said adapter plate is reversible.

* * * * *